(12) United States Patent
Urban et al.

(10) Patent No.: US 10,846,883 B2
(45) Date of Patent: Nov. 24, 2020

(54) METHOD FOR CALIBRATING OBJECTS IN A REFERENCE COORDINATE SYSTEM AND METHOD FOR TRACKING OBJECTS

(71) Applicant: Carl Zeiss Meditec AG, Jena (DE)

(72) Inventors: Steffen Urban, Jena (DE); Stefan Saur, Aalen (DE); Christian Voigt, Abtsgmuend (DE)

(73) Assignee: Carl Zeiss Meditec AG, Oberkochen (DE)

( * ) Notice: Subject to any disclaimer, the term of this patent is extended or adjusted under 35 U.S.C. 154(b) by 0 days.

(21) Appl. No.: 16/533,769

(22) Filed: Aug. 6, 2019

(65) Prior Publication Data
US 2020/0051280 A1  Feb. 13, 2020

(30) Foreign Application Priority Data
Aug. 8, 2018 (DE) .......................... 10 2018 119 343

(51) Int. Cl.
*G06T 7/80* (2017.01)
*G06T 7/50* (2017.01)
*G06T 7/70* (2017.01)
*G06T 7/20* (2017.01)

(52) U.S. Cl.
CPC .................. *G06T 7/80* (2017.01); *G06T 7/20* (2013.01); *G06T 7/50* (2017.01); *G06T 7/70* (2017.01); *G06T 2207/10028* (2013.01); *G06T 2207/10056* (2013.01); *G06T 2207/30204* (2013.01)

(58) Field of Classification Search
None
See application file for complete search history.

(56) References Cited

U.S. PATENT DOCUMENTS

| 7,043,961 B2 | 5/2006 | Pandey et al. |
| 2013/0070076 A1* | 3/2013 | Kuster ................. G02B 21/025 348/79 |
| 2018/0071032 A1* | 3/2018 | de Almeida Barreto ................... H04N 13/246 |

FOREIGN PATENT DOCUMENTS

WO  0167979 A1  9/2001

OTHER PUBLICATIONS

Office Action issued in German Patent Application No. DE 10 2018 119 343.2 (from which this application claims priority), dated Jun. 6, 2019 and English language machine translation thereof.

* cited by examiner

*Primary Examiner* — Edemio Navas, Jr.
(74) *Attorney, Agent, or Firm* — Falk Ewers; Ewers IP Law PLLC (57) ABSTRACT

A method for calibrating an object includes determining a position and an alignment of the object in a reference coordinate system, determining the position of at least three measurement spots by at least one capture apparatus, determining a target spot having a fixed spatial relationship with the measurement spots, determining a spatial relationship between the target spot and a tracking spot located on the object by virtue of the tracking spot being positioned at a calibration spot, and determining the spatial location of the calibration spot by a sensor.

14 Claims, 4 Drawing Sheets

METHOD FOR CALIBRATING OBJECTS IN A REFERENCE COORDINATE SYSTEM AND METHOD FOR TRACKING OBJECTS

CROSS REFERENCE TO RELATED APPLICATIONS

This application claims priority to German patent application DE 10 2018 119343.2, filed Aug. 8, 2018, the entire content of which is incorporated herein by reference.

TECHNICAL FIELD

The disclosure relates to a method for calibrating a position and an alignment of an object in a reference coordinate system and to a method for tracking objects.

BACKGROUND

Tracking or following objects, such as surgical instruments, hands or implants, for example, during a surgical intervention has become indispensable in modern surgery. The surgeon can be assisted by a navigation system with data obtained in advance, such as, for example, the location of a tumor or of an aneurysm in the case of a brain surgery, and a superposition of real data, such as, for example, image data of the patient on the operating table. The data of the instruments determined by the capture device are superposed on the images and these images are visualized. As a result, the positioning and movement of instruments, such as, for example, a suction device or a staple, can be controlled in such a way that no vessels can be injured, and a staple can be positioned in a targeted fashion in the surroundings of an aneurysm. In order to be able to realize such a tracking of objects, the objects must be calibrated in advance and during the surgery.

Typically, at least one camera is used for tracking. The camera can identify the objects to be tracked by image recognition or so-called markers are utilized, which are attached to the object and which can be captured by the camera. By way of example, markers are reflecting elements that can be recognized by a capture apparatus such as, for example, an infrared sensor with illumination or a white-light source with a white-light camera as a sensor. The geometry, e.g., the radius of the markers, is known such that the camera can determine the position of the marker in space by evaluating the at least one image of the at least one marker. At least three markers are required in the case of a camera for the purposes of determining the position and the alignment of the object in space. A plurality of cameras, too, can be used to capture the markers. The spatial location of the objects is determined in a reference coordinate system and the data obtained thus are made available to the navigation system. The latter can process the tracking data of the objects, together with other relevant data which were likewise determined in the reference coordinate system or which were registered with respect to this reference coordinate system. However, it is sometimes also necessary to track not only the movement of the object per se but the movement of a certain point of interest on the object, such as the tip of a suction device or a staple for clamping an aneurysm, for example. Consequently, the surgeon can track the position of the suction device or of the staple in relation to the vessels on a screen and thus bring the staple to the correct position in front of or behind the aneurysm. U.S. Pat. No. 7,043,961 B2 describes a method, in which the tip of a surgical instrument is brought into a conically formed receptacle of a calibration gauge. On the basis of the markers located on the instrument and the calibration gauge, the relative position of the tip of the surgical instrument with respect to the markers of the instrument can be calibrated by estimating the position of the tool tip by rotating the instrument in the receptacle and recording a plurality of images with different positions of the instrument in the calibration gauge. In addition to the fact that the surgical instrument must be moved into the calibration gauge, the time-consuming recording of a plurality of images is a disadvantage of this solution.

The patent application WO 0167979 A1 describes a method, in which the calibration of surgical instruments is carried out with the aid of a calibration gauge. Markers are attached to the instruments and the calibration gauge. The surgical instruments are positioned in the calibration gauge, with the geometry of interest for the function and use of the surgical instrument, e.g., a tip being positioned at a calibration spot or a calibration plane. The position and alignment of the calibration spot or of the calibration plane with respect to the markers of the calibration gauge is known. The capture apparatus captures the position and the alignment of the calibration gauge and of the surgical instrument. The location of the tip of the instrument can be determined, and thus calibrated, by the position and alignment of the surgical instrument in the known calibration gauge, as determined by this measurement. The data thus determined can be stored in a navigation system. For the purposes of checking the calibration of an already calibrated appliance, the determined data are compared to the already captured data and a possible deviation is thus determined.

Both methods are disadvantageous in that they are very complicated, and the surgeon must use an external aid, particularly when checking the calibration.

In this context, external means that the object is located outside of the operating field.

The pointer or the calibration gauge are not directly accessible to the surgeon, and so the surgeon must either replace the instrument with a newly calibrated instrument or bring the instrument into a calibration gauge.

SUMMARY

It is an object of the present disclosure to provide a method for calibrating objects which overcomes the disadvantages of the related art.

This object is achieved by a method for calibrating an object as disclosed herein.

In a method according to an aspect of the disclosure for calibrating an object, the position and alignment of the object can be determined in a reference coordinate system. To this end, the position of at least three measurement spots can be determined initially by at least one capture apparatus, with a target spot being determined, which has a fixed spatial relationship with the measurement spots. The target spot can be defined after a first calibration and stored in a file. As a result, determining the target spot can be omitted in further calibration methods and hence this is optional. For the purposes of determining a spatial relationship between the target spot and a tracking spot located on the object, the latter can be determined by positioning at a calibration spot, wherein the spatial location of the calibration spot can be determined by a sensor.

In modern operating environments, various appliances, e.g., a tracking system for objects such as a suction device with a tip, surgical microscopes and the position and alignment of the patient can be captured in a reference coordinate system of a navigation system, which is referred to below as $KOS_{Ref}$. The navigation system can be an autonomous system, or else it may be part of a surgical microscope. To be able to track the object in the $KOS_{Ref}$, the calibration of the object must be implemented in the $KOS_{Ref}$. To this end, three measuring spots can initially be applied to the object, it being possible to capture said measurement spots by a capture device, such as an infrared sensor with illumination or a camera, for example. The position of the capture device can be known in the $KOS_{Ref}$. A further coordinate system, referred to below as $KOS_{Tar}$, can be formed with the aid of the positions of the three measurement spots. By way of example, a target spot which may lie in the origin of the $KOS_{Tar}$ can be determined from the three measurement spots. For the purposes of tracking a point of interest of the object, e.g., the tip of a suction device, the spatial relationship, i.e., the relative position and alignment of the point of interest, which is referred to as tracking spot below, must be determined with respect to the target spot in the $KOS_{Tar}$. The tracking system can determine the target spot in the $KOS_{Ref}$ by the capture device and it can also capture the location and alignment of the tracking spot by the spatial relationship between the tracking spot and the target spot, i.e., the deviation of the two spots from one another.

The tracking spot can be positioned at a calibration spot for calibration purposes. The position of the calibration spot can be determined by a sensor, such as, for example, a part of the autofocus system, a camera or a stereo camera. Initially, the calibration spot is determined in the coordinate system of the sensor, which is referred to as $KOS_{Sen}$ below. Once the location of the sensor in the $KOS_{Ref}$ is known, the position of the calibration spot, and hence the position of the tracking spot, can be determined by simple coordinate transformation in the $KOS_{Ref}$. As described further above, the position of the target spot is also known in the $KOS_{Ref}$. As a result, it is now possible to determine the deviation of the tracking spot from the target spot in the $KOS_{Tar}$. Hence, the deviation of the tracking spot from the target spot is known in the $KOS_{Tar}$ and, by capturing the three measurement spots on the object, the tracking system can determine the location and alignment of the object and the position of the tracking spot in the $KOS_{Ref}$, without itself re-determining the latter again and again.

In contrast to the methods employed in the related art, in which the calibration spot, for example, is estimated from a plurality of image recordings in different positions or in which the data of a model are used, the method according to an aspect of the disclosure consequently employs a sensor in order to exactly determine the calibration spot.

In particular, the spatial location of the calibration spot can be determined directly by a sensor within the scope of the method for calibrating an object. No calibration gauges or other such aids are required to determine the spatial location of the calibration spot and the deviation of the target spot from the tracking spot. Herein lies an advantage over the method known from the related art, in which instruments must be placed into a calibration gauge for calibration purposes. Moreover, this advantageously yields the option of even being able to use spots on articles whose position is difficult to determine, such as the hand or the finger of the surgeon, as a tracking spot.

In an exemplary embodiment of the method, a line of sight can exist between the calibration spot and the sensor at the time of the calibration.

A line of sight describes a line from a first object to a second object, along which there is a visual connection between the objects. By way of example, the first object can be a surgical instrument and the second object can be a sensor. In the case of sensors, the term sight should be understood within the meaning of the measuring process used for the type of sensor. Obstacles that cannot be penetrated by the sensor must not be located along the line of sight. In the case of optical sensors, a transmission of the employed wavelength is necessary. This also applies to x-ray radiation, sound or other types of sensor systems. The line of sight must only exist at the time of calibration and, for example, can be blocked during a surgery by the surgeon or by other instruments.

According to a further aspect of the method, the calibration spot can be marked by a light spot.

Here, the light spot can be generated practically at any spot of a topography.

In this case, topography describes the envelope of all surfaces in the measurement region of the sensor, i.e., the patient, the operating table, the covers on the patient, the operating field, and the surgeon in the case of a surgical environment.

The calibration spot can be determined by the sensor after the tracking spot, such as the tip of a surgical instrument, for example, was positioned on the light spot. It is also possible for the light spot to be generated at an already known calibration spot. Frequently, the latter may already have been determined by a sensor before it was marked by the light spot. The calibration can be triggered by the user, for example by virtue of pressing a corresponding switch on a user interface, activating a foot switch, pressing a switch on the surgical microscope, or providing a voice command.

In a further exemplary embodiment of the method, the sensor can be part of an autofocus system of a surgical microscope.

Modern surgical microscopes are capable of continuously automatically updating the focus to ensure a sufficiently focused image at all times during a surgery. The use of monitors as main observation means for the operating field places a high demand on the imaging properties and on the autofocus system of the surgical microscope. Both manually triggered autofocusing and manual focusing are possible. This can be used by the surgeon to obtain a better depth impression of the operating field by moving the surgical microscope or in order to focus at a spot that does not correspond to the image center point focused by the autofocus system. The autofocus system can determine the focus value and can use the latter as a reference spot at a known distance from the origin of a coordinate system of the surgical microscope. The position of the surgical microscope, in turn, is known in the $KOS_{Ref}$. By way of example, a navigation system can be used to overlay notifications or information about the location of other objects located in the $KOS_{Ref}$ in an image captured by the surgical microscope or superimpose these on the latter. By way of example, this may be the position and alignment of a surgical instrument with respect to an organ or the position and alignment of an implant in comparison with the previously captured original tooth.

By way of example, focusing the autofocus system can be realized by imaging two light beams or laser beams, which are imaged on one spot in the focus. The optical system of the surgical microscope is therefore adjusted until the two laser spots are imaged at one spot. The focal spot of the surgical microscope can be used as a calibration spot by using the autofocus system as a sensor. In particular, use can be made of the fact that two light or laser spots are rendered congruent in the field of view of the microscope when setting the autofocus of the surgical microscope. By way of example, this can be implemented by virtue of a surgery drape or the situs, for example the patient's skull, being brought into the field of view of the surgical microscope and the autofocus setting being activated. The spatial location of the individual light spot that has arisen thus is known in the reference coordinate system as a matter of principle. If the tracking spot, i.e., the point of interest of the instrument, is now placed in this light spot and if the calibration is then initiated, it is easily possible to determine the spatial relationship between the coordinates of the target spot measured during the calibration and those of the light spot.

If the focal spot is used as a calibration spot, a calibration could be carried out as follows:

A calibration routine is started by the surgeon.
The autofocus is carried out once.
The calibration spot is indicated by a laser spot.
The tracking spot is brought to the calibration spot.
The calibration is actuated by a foot switch, switch, or any other action by the surgeon According to a further aspect of the method, the sensor may include at least one camera.

Surgical microscopes typically include at least one camera to capture an image by the surgical microscope. The image obtained thus can be transferred onto a screen, for example in order to provide a plurality of persons with the option of observing the surgery or else, as described further above, to serve as preferred main observation means for the surgeon themselves. The calibration spot can also be determined by way of image processing from the image captured by the camera. If the spot is already known in the imaged topography, i.e., if it has already been determined in advance, a single image may suffice to determine the spatial position of the calibration spot.

A spot whose position in the $KOS_{Ref}$ is known is a known spot. Accordingly, the position of an unknown spot in the $KOS_{Ref}$ is unknown. The information relating to the position of known spots in the $KOS_{Ref}$ can be stored in a memory of the navigation system or tracking system and are consequently available thereto at all times.

It is also possible to use additional cameras that are not directed through the optical unit of the microscope but directly onto the topography, but which nevertheless are a part of the surgical microscope. Examples of such cameras are peripheral cameras, which capture a larger region of the operating field than the camera viewing through the optical unit of the surgical microscope and which include a sufficient depth of field for the working region in the process. The latter can likewise determine known spots and measure the calibration spot where necessary in the case of spots that are unknown. Alternatively, unknown spots can be determined, for example, by a time-of-flight camera or structured illumination and a camera.

Here, the calibration spot can be marked by a light spot in order to render it visible to the surgeon and in order to advantageously simplify the determination of the calibration spot by using the image processing. Advantageously, a plurality of such known spots can be defined in the lead up to a surgery and can be stored in the navigation system or tracking system. The known spots can be used as calibration spots as desired, since the former can easily be recognized by the image recognition.

If the spot is unknown, the spatial location of the calibration spot can be determined, for example, by image processing of the plurality of images of the camera from different positions. To this end, the camera can be attached to an arm or a carriage, with the position of the camera having to be known in the $KOS_{Ref}$ at the time of recording an image. Determining a spot in space by image processing of a plurality of images from different positions is sufficiently well known and will therefore not be described in any more detail here. The described process is advantageous in that both known and unknown spots can be used as calibration spots.

According to another aspect of the method, the calibration spot can be marked by a marking in the image of the camera of a surgical microscope.

As a result of using a screen as the main observation means of the operating field, as described further above, additional information can also be overlaid into the image that is captured by a camera and transmitted to the screen. By way of example, such an information can be a marking embodied as a reticle, said marking marking the calibration spot at which the tracking spot should be positioned for calibration purposes. Like in the case of the light spot described further above, prescribing the calibration spot by the reticle advantageously simplifies calibration. The predetermined spot may be already known or else unknown. By using image processing of the images captured by a camera, it is possible, as described further above, to determine known and unknown spots in the reference coordinate system $KOS_{Ref}$.

According to a further aspect of the method, the sensor can be a topography sensor.

A topography sensor is a sensor that determines the topography of a surface. By way of example, if use is made of a stereo camera, the topography and, as a result thereof, the spatial position of the calibration spot, too, can be determined by image processing of the two images supplied by the stereo camera. In contrast to the method with only one camera described further above, the stereo camera advantageously need not be moved to this end. This leads to an advantageous faster determination of the calibration spot. Further topography sensors are time-of-flight cameras, structured illumination or laser scanners, which are also referred to as depth sensors.

In a further variant of the method, the tracking spot can be identified by image processing.

Thus, for example, the tip of a suction device can be recognized by comparison with the known geometry of the suction device using image recognition. As soon as the tip of the suction device has been positioned at the calibration spot, the spatial position of the calibration spot is determined using one of the methods described above and hence the tip of the suction device is calibrated. Recognizing the object by image processing of the images of the camera is advantageous in that the object is recognized automatically, specifically when checking the calibration, and the form of the object containing the tracking spot can be compared to a form stored in a database. Thus, changes on the objects can be determined and a hidden or broken tip can be detected.

According to a further aspect of the method, the calibration spot can be defined by the tracking spot.

In this exemplary embodiment of the disclosure, the image processing is used to determine the spatial relationship of the tracking spot with respect to the target spot. As a result, the actual goal of the calibration has already been reached. The position and alignment of the tracking spot in the $KOS_{Ref}$ corresponds to that of the calibration spot in this case. As a result, holding the object in the image field of the camera is already sufficient for the calibration thereof. Advantageously, a real calibration spot is no longer necessary. A real calibration spot should be understood to mean a spot on a topography, in contrast to a spot located in space which can also be referred to as virtual spot. For the purposes of determining the tracking spot by image processing, the model of the object can be stored in a database or the model can be created from a plurality of images with the aid of machine learning.

According to another aspect of the disclosure, the spatial location of the calibration spot can be determined in the reference coordinate system by image processing.

At least two images of a camera or of a stereo camera or of a depth sensor, such as a time-of-flight camera, for example, can be used to determine the spatial location of a spot, marked by a light spot or a reticle, for example, in the reference coordinate system $KOS_{Ref}$ by image processing. To this end, the point need not be known in advance. As a result, the calibration spot can lie at any site of the topography, as a result of which it is possible to bring the object to be calibrated to any site of the topography. This is a significant advantage over the calibration methods described in the related art since this facilitates a fast and simple type of calibration.

According to a further aspect of the method, the camera and/or the topography sensor are part of a surgical microscope.

The calibration of objects, which are used in the case of complex surgeries with the assistance of computer navigation, not only needs to be carried out prior to the surgery but must also be checked at regular intervals during the surgery in order to detect wear, slippage of a marker or damage to the object. Therefore, the calibration with the cameras that are part of the surgical microscope may be advantageous. The object, such as the tip of a suction device, for example, need not be positioned in a calibration gauge arranged outside of the field of view of the surgical microscope but can easily be checked in the operating field, or in the direct vicinity thereof, and can be recalibrated where necessary.

According to another aspect of the disclosure, the position of the at least three measurement spots on the object can be chosen freely.

The at least three measurement spots can be attached to any sites on the object. To this end, use can be made of simple markers which, for example, can be printed onto a self-adhesive film and can be attached to the object. This is advantageous in that no fixed relationship needs to be present between the measurement spots, the markers can be attached to the best-suited sites of the object, and the markers can be easily captured by the capture device. Additional arms on the objects are no longer necessary here, advantageously simplifying the production.

According to yet another aspect of the method, the position of the measurement spots can be determined by image processing.

The position of markers, which mark the measurement spots, and which can have, e.g., a round shape, can be determined very accurately by modern image evaluation algorithms. The relevant geometric variables, such as the radius or diameter in the case of round markers, for example, must to be known to this end. The position of the marker in space can be determined by comparison of the known geometric data of the marker with the data determined from the image processing. Two markers can define a line and three markers can define a plane. As described further above, a target spot can be determined from the at least three markers, said target spot, for example, being able to lie on one of the markers. Additionally, for the purposes of determining the position of the markers, a plurality of images can be captured from various positions and the position can be determined by triangulation. Determining the position of the marker and the calibration of the tracking spot based thereon can be repeated at regular intervals in order to identify deviations by wear of, or damage to, the objects.

A calibration of the objects with sensors as illustrated above is very simple and quick in comparison with the calibration with calibration gauges and, the calibration can be carried out with the sensors of a surgical microscope. These sensors can be the autofocus system, a camera, or a topography sensor, i.e., a depth sensor or a stereo camera. Moreover, use can also be made of external sensors, the positions of which are known in the reference coordinate system $KOS_{Ref}$ of the surgical microscope.

The advantage of the method is that the calibration spot can be determined by a sensor during each calibration, independently of whether the calibration spot was freely chosen by the surgeon or predetermined by the sensors in the surgical microscope, for example the autofocus system.

Following the calibration illustrated above, the respective object of interest can then be tracked in the manner known per se, with recalibrations being possible in a simple manner if necessary.

BRIEF DESCRIPTION OF THE DRAWINGS

The disclosure will now be described with reference to the drawings wherein.

DESCRIPTION OF EXEMPLARY EMBODIMENTS

Figure 1:
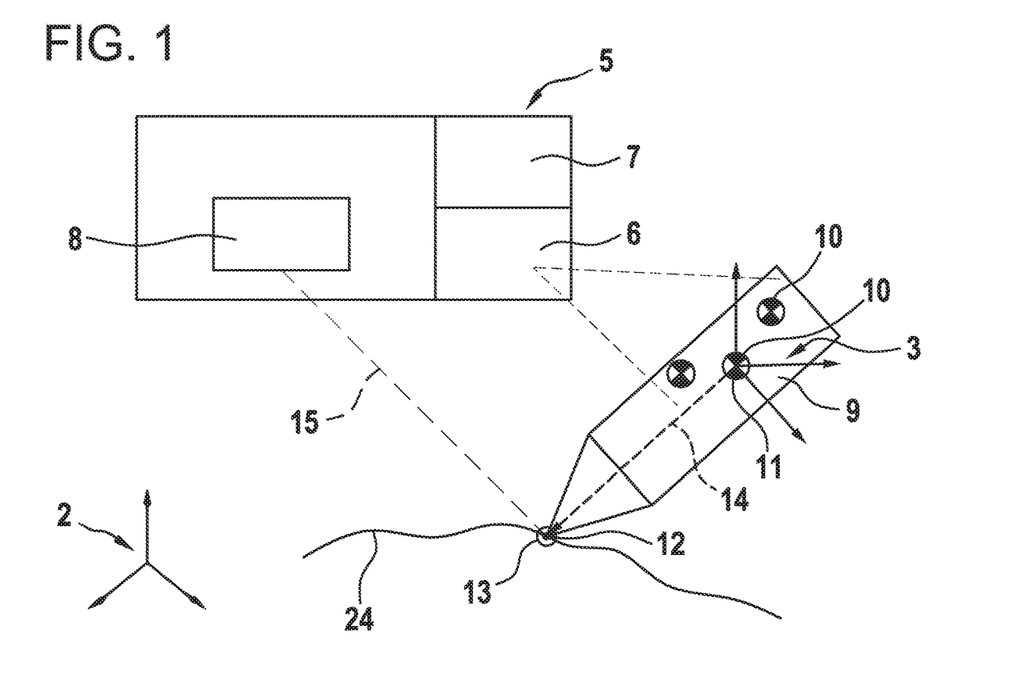
FIG. 1 shows a schematic illustration of a surgical instrument and a capture apparatus arranged in a reference coordinate system according to an exemplary embodiment of the disclosure.

FIG. 1 shows an exemplary embodiment of the disclosure. An object 9 embodied as a surgical instrument 9 is arranged in a reference coordinate system 2, which is denoted as $KOS_{Ref}$ 2 below. Furthermore, a sensor 8 and a capture apparatus 5 are arranged in the $KOS_{Ref}$ 2, with the positions of the sensor 8 and of the capture apparatus 5 in the $KOS_{Ref}$ 2 being known.

By way of example, the object 9 can be a suction device 9, an implant 9, or else the hand 9 of a surgeon. The object 9 includes at least three markers 10, which are attached to any sites on the object 9.

In the $KOS_{Ref}$ 2, the position of the respective marker 10 is determined by the capture apparatus 5, with the position of the capture apparatus 5 in the $KOS_{Ref}$ 2 being known. Various methods for determining the position of the markers 10 are known from the related art, which is why these methods are not described in any more detail here. A target spot 11 is determined from the position of three markers 10, said target spot forming the origin of a target coordinate system 3, which is referred to as $KOS_{Tar}$ 3 below. The origin of the $KOS_{Tar}$ can lie at the position of one of the markers 10, or else at the center of gravity of the markers 10. In principle, the target spot 11 can lie at any site on the object 9.

Furthermore, the object 9 includes a spot 12 of interest for the function and/or application thereof, such as, e.g., the tip 12 of a suction device 7, which is referred to as tracking spot 12 below. It is not always possible to directly capture and track the latter by the capture apparatus 5, which includes an image recording apparatus 6 and a processing unit 7, for example because a marker at the tip of a suction device would impair the view of the surgeon and would harbor a risk of injury to the adjacent tissue. By way of example, such capture apparatuses 5 are used during modern medical surgeries. The capture apparatus 5 can directly capture, determine and track the markers, and hence the target spot.

In order to capture the movement of the tracking spot 12, it is necessary to calibrate the spatial relationship, i.e., the distance and the direction, between target spot 11 and tracking spot 12, i.e., make the spatial relationship available to the capture apparatus. The spatial relationship of the target spot 11 and of the tracking spot 12 is a relative spatial deviation 14 of the tracking spot 12 from the target spot 11 in the $KOS_{Tar}$. In FIG. 1, this deviation 14 is illustrated as a dashed arrow. The capture apparatus 5 can only indirectly capture, determine, and track the tracking spot 12 once the deviation 14 is known.

For calibration purposes, the tracking spot 12 is positioned at a so-called calibration spot 13. A line of sight 15 must be present between sensor 8 and calibration spot 13 at the time of the calibration 13; i.e., no obstacle is positioned between sensor 8 and calibration spot 13. In FIG. 1, the line of sight 15 is illustrated as a dashed line. Once the tracking spot 12 is positioned on the calibration spot 13, the calibration can be started by the user, for example by an entry on a user interface (not illustrated), by an actuation of a foot switch, by pressing a switch on the surgical microscope, or by way of a voice command. Initially, the sensor 8 determines the location of the calibration spot 13 in the coordinate system of the sensor 8, which is referred to as $KOS_{Sen}$ below and the position of which is known in the reference coordinate system 2. Therefore, the position of the calibration spot 13, and hence the location of the tracking spot 12, which is identical to the calibration spot 13 at this time, can be determined in the $KOS_{Ref}$ 2 by a simple coordinate transformation from $KOS_{Sen}$ into the $KOS_{Ref}$. As a result, both the target spot 11 and the tracking spot 12 are known in the reference coordinate system $KOS_{Ref}$ 2 and the spatial relationship between the two spots 11 and 12 can be determined. If the capture apparatus 5 and the sensor 8 are arranged in the same coordinate system, for example in the $KOS_{Sen}$, the spatial relationship of the target spot 11 and of the tracking spot 12 can naturally also be determined with the aid of this coordinate system since this merely relates to a relative spatial deviation of the tracking spot 12 from the target spot 11, which specifies the position and the alignment of the tracking spot 12 in the $KOS_{Tar}$ 3. However, the $KOS_{Ref}$ 2 continues to be the guiding coordinate system, in the coordinates of which the tracking is calculated.

Figure 2:
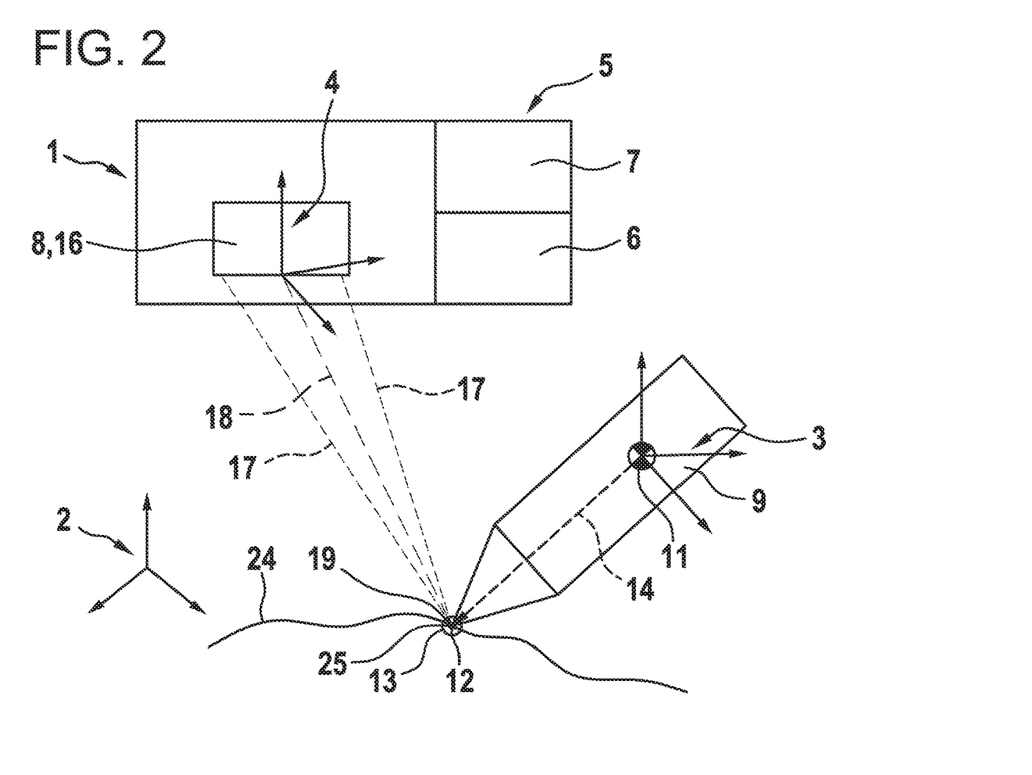
FIG. 2 shows a schematic illustration of a surgical microscope including a sensor embodied as an autofocus system and a capture device according to an exemplary embodiment of the disclosure.

FIG. 2 illustrates a surgical microscope 1, which includes a sensor 8 embodied as an autofocus system 16 and a capture device 5. The capture apparatus 5 need not be part of the surgical microscope 1; instead, it could also be embodied as an external capture apparatus (not illustrated), with knowledge of the position of the capture apparatus in the reference coordinate system $KOS_{Ref}$ 2 then also being required in that case.

The surgical microscope 1 uses an autofocus system 16 for being able to ensure an unchanging high image sharpness, even in the case of a movement of the surgical microscope 1 or the patient. To this end, the autofocus system 16 images two light spots (not illustrated) on the surface of the topography 24. The focus of the optical system of the surgical microscope 1 is now adjusted until the two light spots coincide on a spot, the focal spot 25, on the surface of the topography 24. By way of example, the light can be provided by two lasers. The beam path 17, 17' of the two light spots is illustrated schematically by dashed lines. This ensures that the surface decisive to the surgeon is illustrated in focus by the surgical microscope 1. The focal spot is determined relative to the covering panel of the optical beam path of the surgical microscope 1, which corresponds to the origin of the $KOS_{Sen}$ 4 of the sensor. The spatial location of the surgical microscope 1 is known in the $KOS_{Ref}$ 2 and the spatial location of the focal spot in the $KOS_{Sen}$ 4 is likewise known. As a result, the position of the focal spot in the $KOS_{Ref}$ 2 can easily be determined by a coordinate transform between the two KOS 2 and 4. Consequently, the spatial location of the focal spot 19, determined by the autofocus system 8 and 16, is also known in the $KOS_{Ref}$ 2.

The focal spot of the surgical microscope 1 is therefore used as calibration spot 13 for calibrating the deviation 14 between the target spot 11 and the tracking spot 12 in the $KOS_{Ref}$ 2. To this end, the tracking spot 12 is positioned on the focal spot 25 of the surgical microscope 1, the latter being configured as a calibration spot 13 in this case, and a calibration is started. Here, a light beam 18 can mark the focal spot by a light spot 19 on the topography 24. In a focused system, the light spot 19 can be generated by the two then coinciding light spots used to autofocus (not illustrated); however, a light spot 19 from a different source may also be used to mark the focal spot. For calibration purposes, the surgeon need not avert their gaze from the image of the surgical microscope 1; instead, the calibration can be carried out, as it were, in the image of the surgical microscope 1, as a result of which the calibration and, in particular, a recalibration of surgical instruments is shortened by way of only one recording and the short duration connected therewith. Additionally, no movement of the instrument is necessary, as a result of which the method is simplified.

Figure 3:
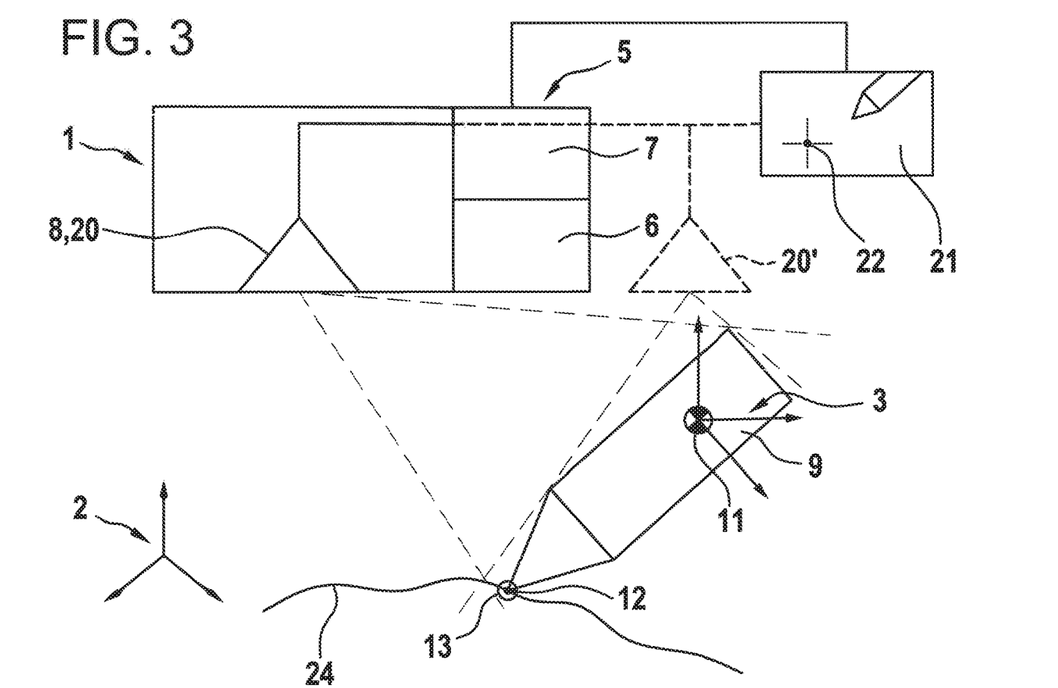
FIG. 3 shows a schematic illustration of a surgical microscope with a sensor embodied as a camera according to a further exemplary embodiment of the disclosure.

FIG. 3 shows a surgical microscope 1 with a sensor 8 embodied as a camera 20, wherein the camera 20 may alternatively also be an external camera 20'. The alternative external camera 20' is illustrated in FIG. 3 using dashed lines.

The surgical microscope 1 is linked to a capture apparatus 5 to capture and process the images and data captured by the surgical microscope 1. The alternative external camera 20' is likewise linked to the capture apparatus 5. The camera 20 and the optional external camera 20', and also the capture apparatus 5, are linked to a display 21, which is embodied as a monitor. The display 21 can visualize directly (dashed line) the images captured by the camera 20, 20' or visualize said images after an image processing process carried out by the capture apparatus 5. When processing the images captured by the camera 20, 20', further images or objects can be overlaid thereon. By way of example, a marking 22, such as a reticle, can be superimposed on the image of the surgical microscope 1. Consequently, the focal spot 13 of the surgical microscope 1 used as a calibration spot 13, for example, can be visualized. Equally, any other known or unknown spot on the surface of the topography 24 can be presented by the marking 22, wherein the spot should lie in the measurement region of the employed sensor 5 in this case.

If the marking 22 is directed to a known spot of the topography 24, i.e., if the distance between surgical microscope 1 and calibration spot has been determined in advance, the processing apparatus 7 can recognize the known spot by an image capture process applied to the image captured by the camera 20 and hence can determine the spatial location of the calibration spot 13 in the $KOS_{Ref}$, calibrated in advance and stored in the processing apparatus 7.

If the spot on the topography 24 marked by the marking 22 is unknown, the spatial location of the point can be determined by a plurality of images of the camera 20 and 20' and corresponding subsequent processing of the captured images in the processing apparatus 7 or by any other suitable sensor, such as a time-of-flight camera, for example, which can determine the topography with just one recording. In this case, the marking 22 only serves as an aid for the surgeon since the spatial location of the calibration spot 13 is only determined after positioning the object 9 on the calibration spot 13. The precise location of the spot on which the tracking spot 12 is positioned is therefore not relevant prior to the calibration.

Figure 4:
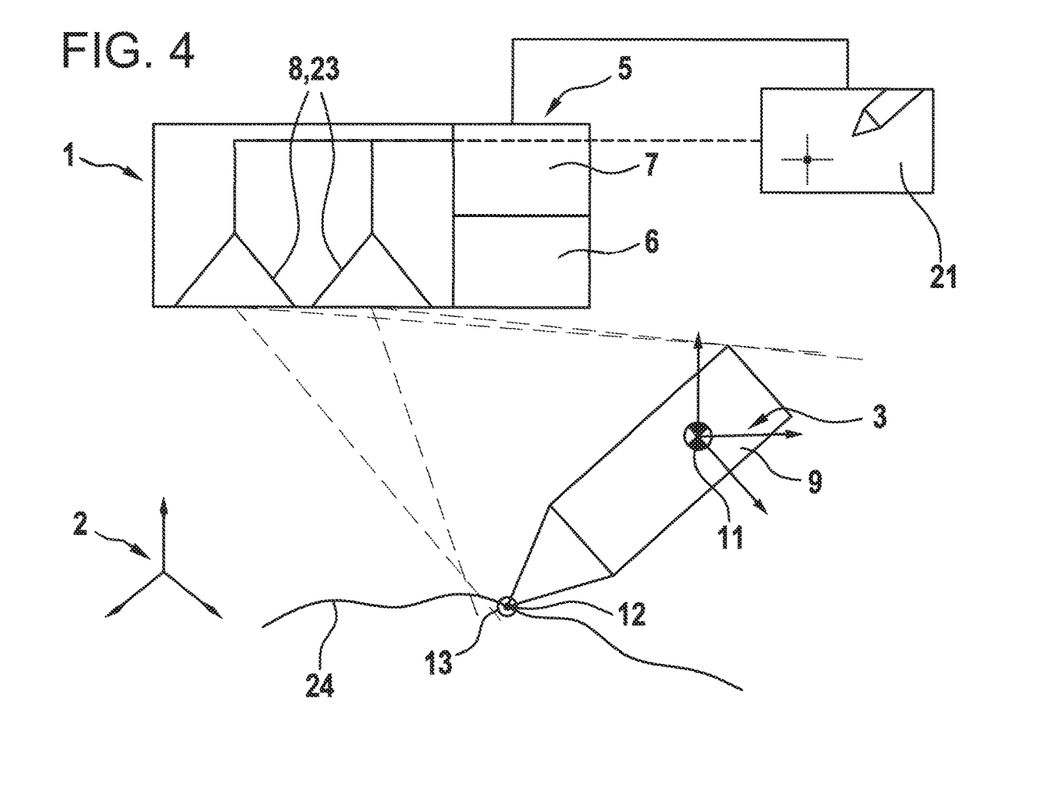
FIG. 4 shows sensor embodied as a stereo camera according to a further exemplary embodiment of the disclosure.

FIG. 4 shows a sensor 8 embodied as a stereo camera 23, said sensor being configured to determine the spatial location of a spot in the topography 24. The position of the stereo camera 23 must be known in the $KOS_{Ref}$ 2. The stereo camera 23 captures two images of a spot at the same time, with the spot being captured from different distances and/or angles in the process. As a result, the position of the spot can be determined by triangulation. In comparison to a single camera 20, which must be moved into the various recording positions, and which captures the images in succession, the stereo camera 23 is able to determine the position and the location of a spot in the $KOS_{Ref}$ 2 more quickly. Moreover, the stereo camera 23 can also be used to capture the tracking spot 12. With the aid of CAD models of the object 9, stored in the processing unit 7 in advance, the geometry of the object 9 and the tracking spot 12 thereof can be determined by the images captured by the stereo camera 23 and by an image processing process following in the processing unit 7. A further option includes training the geometry of the object 9 by machine learning by virtue of images being recorded from different directions and angles, and said images being combined to form the geometry of the object 9 in an image processing process of the processing unit 7. By the known geometry and the option, described further above, of determining the position and location of the object 9 in space, it is possible to determine the spatial relationship of the target spot 11 and of the tracking spot 12 in the $KOS_{Ref}$ 2. In this case, the spatial location of the tracking spot 12 determined thus is also the spatial location of the calibration spot 13 in the $KOS_{Ref}$ 2 at the same time. Thus, it is enough to position the object 9 in the capture region of the stereo camera 23 to carry out a calibration of the object 9. This is a simplification of the calibration process. Particularly for recalibrations to be carried out repeatedly during an intervention, this type of calibration is a simplification which leads to fewer interruptions of the surgery.

Figure 5:
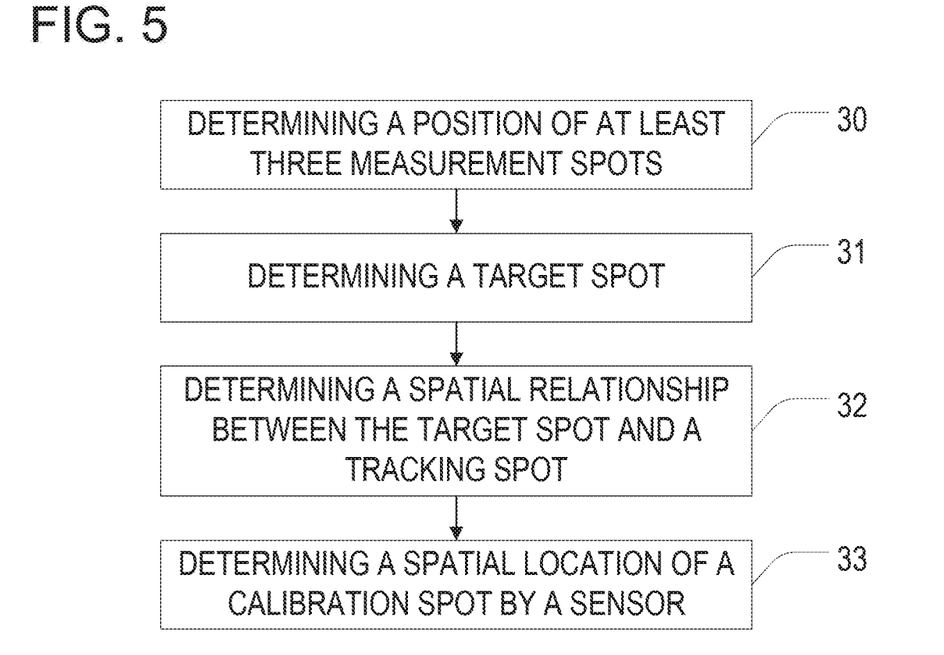
FIG. 5 shows a flowchart of a method according to an exemplary embodiment of the disclosure.

FIG. 5 shows a flowchart of a method according to an exemplary embodiment of the disclosure for calibrating an object, wherein the position and alignment of the object are determined in a reference coordinate system.

The position of at least three measurement spots 10 is determined by at least one capture apparatus 5 in a first method step 30.

A target spot 11, which has a fixed spatial relationship to the measurement spots 10, is determined in a second optional method step 31. Depending on the type of markers, the target spot is predefined or needs to be newly determined during the calibration.

The spatial relationship 14 between the target spot 11 and a tracking spot 12 located on the object is determined in a third method step 32 by positioning the tracking spot 12 on a calibration spot 13.

The spatial location of the calibration spot 13 is determined by a sensor 8 in a fourth method step 33.

Figure 6:
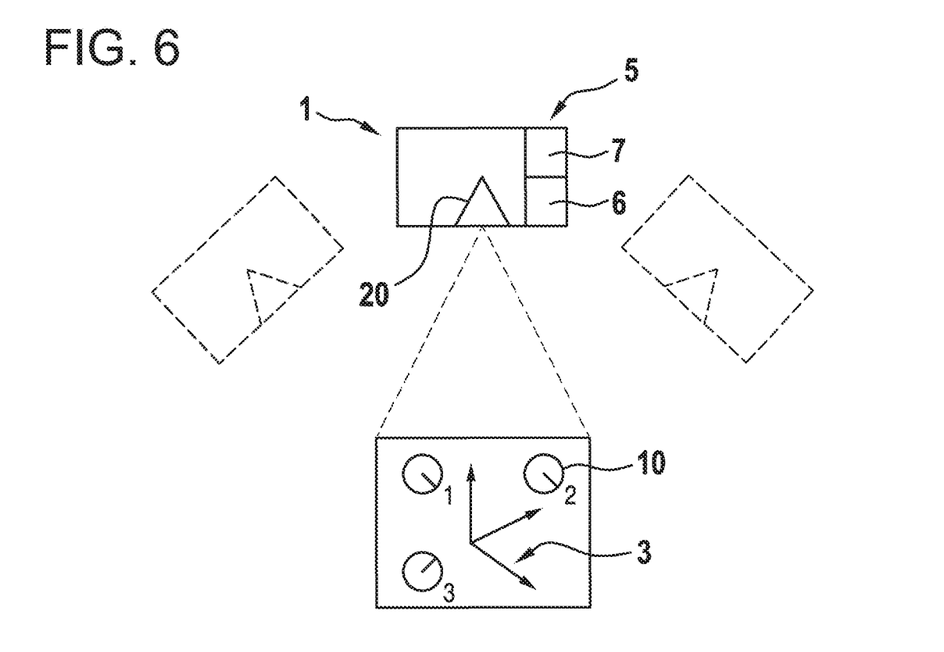
FIG. 6 shows a schematic illustration of a detail of an exemplary embodiment of the disclosure.

FIG. 6 shows a camera 20, which is integrated in a surgical microscope 1. The calibrated camera 20 captures an image of at least three markers 10, which are located on an object 9. By way of example, the object 9 can be a surgical instrument 9 or else the hand of a surgeon. The markers 10 have, e.g., a circular embodiment and have a unique ID such that the markers 10 can be distinguished from one another. The radius or the diameter of the markers 10 is known in metric fashion. Hence, the markers 10 can be identified by image processing of the images captured by the camera 20 and the position and the location in space can be determined. To this end, the two-dimensional image of the calibrated camera 20 can be converted into a three-dimensional location vector, for example. Thus, the size of the markers, and hence the position, can be determined using the intercept theorem. The markers 10 may also include grayscale value levels, which simplifies image processing but does not yield a fundamentally different result.

The position of the markers can be determined by the following formulae:

$$x_m^1 = v_1 * \frac{r_w}{r_1}$$

$$v_1 = K^{-1} * p_1$$

$$K = \begin{matrix} f & 0 & x_0 \\ 0 & f & y_0 \\ 0 & 0 & 1 \end{matrix}$$

$$p_1 = x_1 \ y_1 \ 1$$

where
$x_m$=spot of a marker,
$r_w$=radius in [m],
$r_1$=radius in [pixels]=$\|p_1 - p_2\|$,
$p_1$=center of the circle in the image=$[x_1, y_1, 1]$,
$p_2$=edge spot of the marker in the image,
$v_1$=image vector of a marker=$K^{-1}*p_1$, and
K=matrix of the camera at the focal spot.

The markers 10 need only satisfy the conditions described above; this is advantageous in that use can be made of simple markers 10 that are printed on a self-adhesive film and that can be attached on the object 9 as desired.

The position of the markers 10 can also be determined by processing a plurality of images from various positions of a camera 20, as illustrated in FIG. 6 using dashed lines. After processing the images with an image processing process in the processing unit 7, the spatial location of the individual markers 10 can be determined by triangulation. Once the positions of the three markers 10 have been determined, a target spot 11, for example a position of a marker 10 on the object 9, can be determined therefrom. The latter forms the origin of the tool coordinate system $KOS_{Tar}$. The position of the camera 20 can be determined by various processes. An already calibrated marker 10 is used in one process. The position of the camera 20 can be determined by evaluating the individual images of the calibrated marker 10 in an image processing process for the respective images.

A second process is the determination of the position or the movement of the surgical microscope 1 by an external camera or any other suitable sensor.

A third process is the use of the angle sensors of the carrier arm of the surgical microscope 1 to determine the position of the camera 20.

Figure 7:
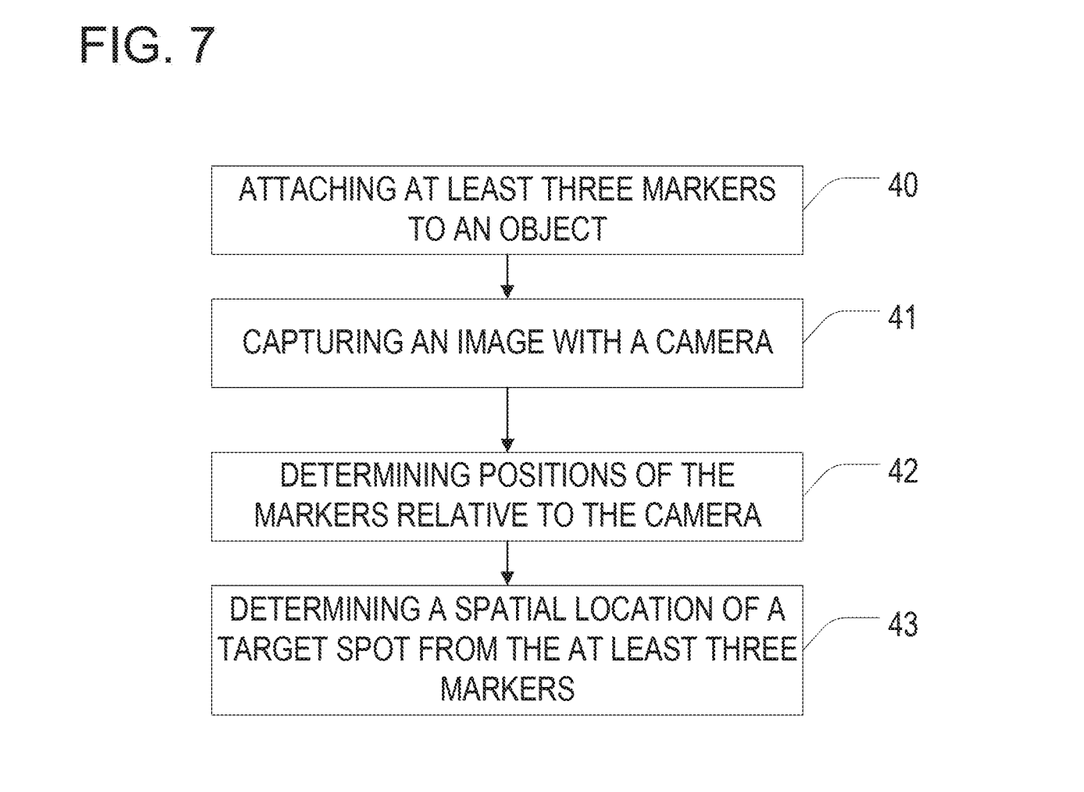
FIG. 7 shows a flowchart of a method according to an exemplary embodiment of the disclosure.

FIG. 7 shows a flowchart of a method for determining a spacing of at least three markers on an object.

At least three markers 10 are attached to an object 9 in a first method step 40. An image in which all markers 10 can be identified is captured with a camera in a second method step 41.

The position of the markers 10 relative to the camera 20 is determined by image processing in a third method step 42.

The spatial location of a target spot 12 is determined from the at least three markers 10 in a fourth method step 43.

As described further above with regard to FIG. 6, the method can also be carried out with a plurality of images from different known positions of the camera. The image processing and the algorithms used in the process are known and therefore not explained in more detail here.

It is understood that the foregoing description is that of the exemplary embodiments of the disclosure and that various changes and modifications may be made thereto without departing from the spirit and scope of the disclosure as defined in the appended claims.

LIST OF REFERENCE SIGNS

1 Surgical microscope
2 Reference coordinate system ($KOS_{Ref}$)
3 Target coordinate system ($KOS_{Tar}$)
4 Sensor coordinate system ($KOS_{Sen}$)
5 Capture unit
6 Image recording apparatus
7 Processing unit
8 Sensor
9 Object
10 Marker
11 Target spot
12 Tracking spot
13 Calibration spot
14 Deviation
15 Line of sight
16 Autofocus system
17 Beam path (surgical microscope)
18 Light beam
19 Light spot
20 Camera
21 Display
22 Marking
23 Topography sensor/stereo camera
24 Topography
25 Focal spot
30 Method step 1
31 Method step 2
32 Method step 3
33 Method step 4
40 Method step 1
41 Method step 2
42 Method step 3
43 Method step 4

What is claimed is:

1. A method for calibrating an object, the method comprising:
    determining a position and an alignment of the object in a reference coordinate system;
    determining positions of at least three measurement spots in the reference coordinate system by at least one capture apparatus arranged at a known position in the reference coordinate system, the at least one capture apparatus including a sensor defining a sensor coordinate system;
    determining a target spot having a fixed spatial relationship with the at least three measurement spots;
    determining a spatial relationship between the target spot and a tracking spot located on the object with the tracking spot being positioned at a calibration spot; and
    determining a spatial location of the calibration spot with the sensor by determining first coordinates of the position of the calibration spot in the sensor coordinate system and by transforming the first coordinates to second coordinates in the reference coordinate system.

2. The method as claimed in claim 1, further comprising:
    defining a line of sight between the calibration spot and the sensor at a time of calibration.

3. The method as claimed in claim 1, further comprising:
    marking the calibration spot by a light spot.

4. The method as claimed in claim 1, wherein the sensor forms a part of an autofocus system of a surgical microscope.

5. The method as claimed in claim 1, wherein the sensor includes at least one camera.

6. The method as claimed in claim 5, further comprising:
    marking the calibration spot by a marking in an image of the at least one camera of a surgical microscope.

7. The method as claimed in claim 5, wherein the sensor is a topography sensor.

8. The method as claimed in claim 5, further comprising:
    identifying the tracking spot by image processing.

9. The method as claimed in claim 8, further comprising:
    defining the calibration spot by the tracking spot.

10. The method as claimed in claim 7, further comprising:
    determining the spatial location of the calibration spot in the reference coordinate system by image processing.

11. The method as claimed in claim 7, wherein the at least one camera and/or the topography sensor are parts of a surgical microscope.

12. The method as claimed in claim 1, further comprising:
    selecting the position of the at least three measurement spots on the object.

13. The method as claimed in claim 1, further comprising:
    determining the position of the at least three measurement spots by image processing.

14. A method for tracking an object in a reference coordinate system, the method comprising:
    calibrating of the object by:
    determining a position and an alignment of the object in the reference coordinate system;
    determining the position of at least three measurement spots in the reference coordinate system by at least one capture apparatus arranged at a known position in the reference coordinate system, the at least one capture apparatus including a sensor defining a sensor coordinate system;
    determining a target spot having a fixed spatial relationship with the at least three measurement spots;

determining a spatial relationship between the target spot and a tracking spot located on the object with the tracking spot being positioned at a calibration spot; and determining a spatial location of the calibration spot with the sensor by determining first coordinates of the position of the calibration spot in the sensor coordinate system and by transforming the first coordinates to second coordinates in the reference coordinate system.

* * * * *